US008346376B2

(12) United States Patent
Engelen et al.

(10) Patent No.: US 8,346,376 B2
(45) Date of Patent: Jan. 1, 2013

(54) METHOD AND SYSTEM FOR AUTOMATICALLY VERIFYING THE POSSIBILITY OF RENDERING A LIGHTING ATOMOSPHERE FROM AN ABSTRACT DESCRIPTION

(75) Inventors: Dirk V. R. Engelen, Heusden-Zolder (BE); Mark H. Verberkt, Eindhoven (NL); Leon C. A. Van Stuivenberg, Helmond (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 507 days.

(21) Appl. No.: 12/598,222

(22) PCT Filed: Apr. 28, 2008

(86) PCT No.: PCT/IB2008/051624

§ 371 (c)(1),
(2), (4) Date: Oct. 30, 2009

(87) PCT Pub. No.: WO2008/135894

PCT Pub. Date: Nov. 13, 2008

(65) Prior Publication Data

US 2010/0134050 A1 Jun. 3, 2010

(30) Foreign Application Priority Data

May 3, 2007 (EP) .................................... 07107415

(51) Int. Cl.
*G06F 19/00* (2011.01)

(52) U.S. Cl. ........................................... 700/12; 700/19

(58) Field of Classification Search .................... 700/12, 700/17, 19, 286; 715/771; 703/1, 13; 709/203; 345/765; 315/312

See application file for complete search history.

(56) References Cited

U.S. PATENT DOCUMENTS

| | | | | |
|---|---|---|---|---|
| 5,969,485 | A * | 10/1999 | Hunt | 315/292 |
| 6,466,234 | B1 | 10/2002 | Pyle et al. | |
| 7,202,613 | B2 * | 4/2007 | Morgan et al. | 315/312 |
| 7,348,736 | B2 * | 3/2008 | Piepgras et al. | 315/291 |
| 7,914,172 | B2 * | 3/2011 | Nagara et al. | 362/231 |
| 8,026,673 | B2 * | 9/2011 | Lys | 315/291 |
| 2002/0180973 | A1 | 12/2002 | MacKinnon et al. | |
| 2003/0040813 | A1 | 2/2003 | Gonzales et al. | |
| 2005/0116667 | A1 * | 6/2005 | Mueller et al. | 315/312 |
| 2005/0248299 | A1 * | 11/2005 | Chemel et al. | 315/312 |

FOREIGN PATENT DOCUMENTS

WO 2008078286 A1 7/2008

OTHER PUBLICATIONS

Wacks, K.: "International Model of a Lighting Control System"; HTINews article, Jun. 1998, Downloaded Oct. 23, 2006 Form http://www.hometoys.com/htinews/jun98/articles/wacks/wacks.htm, 6 Page Article.

* cited by examiner

*Primary Examiner* — Kidest Bahta
(74) *Attorney, Agent, or Firm* — John F. Salazar; Mark L. Beloborodov

(57) ABSTRACT

The invention relates to automatically verifying the possibility of rendering a lighting atmosphere from an abstract description, for example from a lighting atmosphere specified in XML (Extensible Markup Language) independent of a specific lighting infrastructure and of a room layout. A basic idea of the invention is to create for each addressable light unit of a light infrastructure a so called light infrastructure capability that generally describes the effect, measures the maximum possible effect and relates the effect to a location in a semantic area of a target environment. This allows to automatically verifying the possibility of rendering a lighting atmosphere from an abstract description in a lighting infrastructure at an early stage of the lighting atmosphere design process.

13 Claims, 13 Drawing Sheets

| |
|---|
| FIG. 2A-I |
| FIG. 2A-II |

FIG. 2A

```
<!DOCTYPE atmosphere SYSTEM "atmo.dtd">
<atmosphere name="Summer picture 2" id="18">
        <scene>

<!-- Cash register-->
        <lightelement areaselector="\cash register area" fadeintime="0" fadeouttime="0">
                <lighteffecttype>
                        <ambient intensity="200" colour="0.48,0.6" />
                </lighteffecttype>
        </lightelement>

        <lightelement areaselector="\cash register area" fadeintime="0" fadeouttime="0">
                <lighteffecttype>
                        <accent intensity="2000" colour="0.3,0.3" />
                </lighteffecttype>
        </lightelement>

        <lightelement areaselector="\cash register" fadeintime="0" fadeouttime="0">
                <lighteffecttype>
                        <accent intensity="2000" colour="0.3,0.3" />
                </lighteffecttype>
        </lightelement>
```

FIG. 2A-I

| FIG. 2A-I |
| --- |
| FIG. 2A-II |

FIG. 2A

```
<!-- ladies fashion\designer 1-->

    <lightelement areaselector="\ladies fashion\designer 1\clothing rack"
            fadeintime="0" fadeouttime="0">
            <lighteffecttype>
                    <accent intensity="2000" colour="0.3,0.3" />
            </lighteffecttype>
    </lightelement>

    <lightelement areaselector="\ladies fashion\designer 1\mannequin" fadeintime="0"
            fadeouttime="0">
            <lighteffecttype condition="noperson">
                    <accent intensity="5000" colour="0.55,0.4" />
            </lighteffecttype>
            <lighteffecttype condition="personnear">
                    <accent intensity="2000" colour="0.3,0.3" />
            </lighteffecttype>
    </lightelement>

    <lightelement areaselector="\ladies fashion\designer 1\wall" fadeintime="0"
            fadeouttime="0">
            <lighteffecttype>
                    <architectural>
                            <picturewallwash pngfile="summer_2_left.png"
                                    intensity="2000"/>
                    </architectural>
            </lighteffecttype>
    </lightelement>
```

FIG. 2A-II

| |
|---|
| FIG. 2B-I |
| FIG. 2B-II |

FIG. 2B

```
<lightelement areaselector="\ladies fashion\designer 2\clothing rack"
        fadeintime="0" fadeouttime="0">
        <lighteffecttype>
                <accent intensity="500" colour="0.3,0.3" />
        </lighteffecttype>
</lightelement>

<!-- ladies fashion\designer label 3-->

<lightelement areaselector="\ladies fashion\designer 3\clothing rack"
        fadeintime="0" fadeouttime="0">
        <lighteffecttype>
                <accent intensity="2000" colour="0.3,0.3" />
        </lighteffecttype>
</lightelement>
```

FIG. 2B-I

| FIG. 2B-I |
|---|
| FIG. 2B-II |

FIG. 2B

```
<lightelement areaselector="\ladies fashion\designer 3\wall" fadeintime="0"
        fadeouttime="0">
        <lighteffecttype>
                <architectural>
                        <wallwash intensity="1500" colour="0.2,0.05" />
                </architectural>
        </lighteffecttype>
</lightelement>

<lightelement areaselector="\ladies fashion\designer 3\mannequin" fadeintime="0"
        fadeouttime="0">
        <lighteffecttype condition="noperson">
                <accent intensity="5000" colour="0.55,0.4" />
        </lighteffecttype>
<lighteffecttype condition="personnear">
                <accent intensity="2000" colour="0.3,0.3" />
        </lighteffecttype>
</lightelement>
```

FIG. 2B-II

| FIG. 2C-I |
| --- |
| FIG. 2C-II |

FIG. 2C

```
<!--discount-->

<lightelement areaselector="\discount" fadeintime="0" fadeouttime="0">
        <lightdistribution coordinatesystem="3D" intensity="500">
                <shape type="square">
                        <vertex x="-0.5" y=" 0.5" />
                        <vertex x="-0.5" y="-0.5" />
                        <vertex x=" 0.5" y="-0.5" />
                        <vertex x=" 0.5" y=" 0.5" />
                </shape>
                <colourpoints>
                        <colour colour="0.2,0.15" />
                        <colour colour="0.3,0.2" />
                        <colour colour="0.4,0.3" />
                        <colour colour="0.5,0.4" />
                </colourpoints>
        </lightdistribution>
</lightelement>
```

FIG. 2C-I

| |
|---|
| FIG. 2C-I |
| FIG. 2C-II |

FIG. 2C

```
<lightelement areaselector="\discount\ladies fashion\wall" fadeintime="0"
        fadeouttime="0">
        <lighteffecttype>
                <architectural>
                    <picturewallwash pngfile="picturewallwashdiscount.png"
                        intensity="3500"/>
                </architectural>
        </lighteffecttype>
</lightelement>

<lightelement areaselector="\discount\ladies fashion\mannequin" fadeintime="0"
        fadeouttime="0">
        <lighteffecttype condition="noperson">
                <accent intensity="3000" colour="0.5,0.3" />
        </lighteffecttype>
        <lighteffecttype condition="personnear">
                <accent intensity="3000" colour="0.3,0.3" />
        </lighteffecttype>
</lightelement>

</scene>
</atmosphere>
```

FIG. 2C-II

METHOD AND SYSTEM FOR AUTOMATICALLY VERIFYING THE POSSIBILITY OF RENDERING A LIGHTING ATOMOSPHERE FROM AN ABSTRACT DESCRIPTION

The invention relates to automatically verifying the possibility of rendering a lighting atmosphere from an abstract description, for example from a lighting atmosphere specified in XML (Extensible Markup Language) independent of a specific lighting infrastructure and of a room layout.

Current lighting systems in commercial environments and homes have a rather fixed setup. Light systems in theatres and discos have lots of dynamics, but this is mostly programmed and the scripts are specific for the light system. In future light systems for commercial and home environments, light atmospheres may be created from scripts which describe the static and dynamic elements of a lighting atmosphere, created by a variety of colored and white light units, but are independent of the specific lighting infrastructure. These scripts should cover a wide range of possible lighting systems. Thus, these scripts must describe a certain lighting atmosphere in an abstract way in order to be useable with a plurality of different lighting systems. An abstract description of a lighting atmosphere may be for example made in XML (Extensible Markup Language). The term "abstract" means independent of a specific lighting system or infrastructure, i.e. the light units, and independent of a specific room or building layout.

The system independent light script or abstract description of a lighting atmosphere can be automatically rendered to a target environment. For a set of locations in the target environment, the desired light effects and light settings have to be created. This can be done by splitting up the light script into parts that are related to semantic areas (locations in the target environment). Light units in the semantic areas are selected to realize the effects and control values for these lamps have to be determined. In the step of automatically rendering a lighting atmosphere to a target environment, it would be helpful to verify whether the rendering in a specific target environment is possible or not.

It is an object of the invention to provide an automatic verification of the possibility of rendering a lighting atmosphere from an abstract description, particularly in order to obtain an early feedback on rendering a lighting atmosphere in a certain lighting environment.

The object is solved by the independent claim(s). Further embodiments are shown by the dependent claim(s).

A basic idea of the invention is to create for each addressable light unit of a light infrastructure a so called light infrastructure capability that generally describes the effect, measures the maximum possible effect and relates the effect to a location in a semantic area of a target environment. A light infrastructure capability may help to detect in an early stage of rendering a certain lighting atmosphere from an abstract description whether rendering is possible or not. Individual light infrastructure capabilities may be clustered together, based on the light effect they generate, for example ambient, spot light or wall wash, and based on the location in the semantic areas. This allows creating light infrastructure capabilities for parts of semantic areas of a lighting infrastructure. Furthermore, light infrastructure capabilities may be clustered towards the semantic areas, so that they describe the lighting possibilities in the semantic areas. Thus, a light infrastructure capability may be used in the process of automatically rendering a certain lighting atmosphere from an abstract description in order to describe the lighting possibilities in semantic areas and makes it possible to give an early feedback of the possibility of rendering the certain lighting atmosphere in a certain lighting infrastructure. The concept of light infrastructure capabilities as described herein is closely connected with the concept of light element templates as described in the European patent application no. 06127084.9 of the applicant. In general, a light element template contains an indication of the possibilities of the lighting infrastructure at a certain semantic location, for example in a shop or a home in which the lighting infrastructure is provided. Thus, a light element template is a higher abstraction level of the possibilities in a lighting infrastructure than the light infrastructure capabilities which are more closely related to the individual lighting possibilities in a lighting infrastructure such as the light type, intensity range, the light effect and location of light effects of a specific light unit of a lighting infrastructure.

In the following, some important terms used herein are explained.

The term "lighting atmosphere" as used herein means a combination of different lighting parameters such as intensities of different spectral components of lighting, the colors or spectral components contained in a lighting, the color gradient or the like.

The term "abstract description" of a lighting atmosphere means a description of the atmosphere at a higher level of abstraction than a description of settings of the intensity, color or like of every individual lighting device or unit of a lighting infrastructure. It means for example the description of the type of a lighting such as "diffuse ambient lighting", "focused accent lighting", or "wall washing" and the description of certain lighting parameters such as the intensity, color, or color gradient at certain semantic locations at certain semantic times, for example "blue with low intensity in the morning at the cash register" or "dark red with medium intensity at dinner time in the whole shopping area". Furthermore, "abstract description" herein means an essentially lighting system independent lighting atmosphere description.

The term "semantic location" or "semantic time" means a description of a location or time such a "cash register" in a shop or "lunch time" in contrast to a concrete description of a location with coordinates.

It should be understood that the abstract description of a lighting atmosphere does not comprise concrete information about a specific instance of a lighting infrastructure such as the number and locations of the used lighting units or devices and their colors and available intensities.

The term "lighting infrastructure" means a concrete implementation of a lighting system in a specific environment or room, for example a specific instance of a lighting system applied to a certain shop, hotel lobby, or restaurant. The term "lighting infrastructure" comprises a complex system for illumination, particularly containing several lighting units, for example a plurality of LEDs (light emitting diodes) or other lighting devices such as halogen bulbs. Typically, such a lighting infrastructure applies several tens to hundreds of these lighting devices so that the composition of a certain lighting atmosphere by individually controlling the characteristics of each single lighting device would require computerized lighting control equipment.

According to an embodiment of the invention, a method for automatically verifying the possibility of rendering a lighting atmosphere from an abstract description is provided, wherein the method comprises the following characteristic features:

- electronically receiving light infrastructure capabilities of a lighting infrastructure, wherein a light infrastructure capability describes light type, intensity range, the light effects and location of the effects of a certain light unit of the lighting infrastructure on a target environment, automatically processing the received light infrastructure capabilities, and signaling whether rendering the lighting atmosphere from the abstract description is possible or not.

By receiving and processing the light infrastructure capabilities, it is possible to give an early feedback in the process of automatically rendering a desired lighting atmosphere from an abstract description. The light infrastructure capabilities allow for automatically processing light unit specific features during the rendering process.

According to a further embodiment of the invention, the method may further comprise the step of automatically creating a light infrastructure capability for every individually addressable light unit of the lighting infrastructure. Particularly, a light infrastructure capability for an individually addressable light unit may be created by a light unit controller of the light infrastructure which provides a description of its control interface and announces the controlled light units. A light infrastructure capability for an individually addressable light unit may also be created by means of a calibration, particularly a dark room calibration, where the effect of specific control sets is executed on the light unit and the effect of the controlled light unit is measured by cameras and/or sensors.

According to a further embodiment of the invention, the step of automatically processing the received light infrastructure capabilities comprises clustering several light infrastructure capabilities into larger groups of light infrastructure capabilities according to certain criteria. By clustering light infrastructure capabilities, the number of light infrastructure capabilities to be automatically processed may be decreased. For clustering, one or more of the following criteria may be used:

light units of the same type, light units that create similar effects in adjacent locations in the lighting infrastructure, and light units that have an effect in one semantic area.

According to a further embodiment of the invention, the step of automatically processing the received light infrastructure capabilities may comprise creating light element templates from the received light infrastructure capabilities of the lighting infrastructure, wherein a light element template contains an indication of the possibilities of the lighting infrastructure at a certain semantic location of a lighting infrastructure, and comparing the created light element templates with the light elements of the abstract description.

The light element templates may be created as described and disclosed in detail in the European patent application no. 06127084.9 of the applicant. The usage of light element templates makes the automatic processing of the light infrastructure capabilities easier since only a comparison step is required in order to determine whether a light effect described in the abstract description may be rendered in the target lighting environment.

According to a further embodiment of the invention, the method may comprise the further step of automatically making information on available light units of the lighting infrastructure and their capabilities available in a network environment by means of a service and device discovery mechanism.

According to an embodiment of the invention, the method may further comprise the steps of selecting a lighting atmosphere by a client communicating with a server, transmitting light infrastructure capabilities of a lighting infrastructure from the client to the server, automatically processing the received light infrastructure capabilities, transmitting the processing result from the server to the client, and signaling whether rendering the selected lighting atmosphere from the abstract description is possible or not depending on the received processing result on the client.

This embodiment is useful for home lighting and obtaining lighting atmospheres over a communication network such as the internet. The client may be a personal computer at home, for example accessing a website offering lighting atmospheres for buying. A user may select a desired lighting atmosphere on the website. Next, the personal computer of the user may transmit the infrastructure capabilities of the home lighting infrastructure to the server, for example after the user has clicked on a certain button of the website. The infrastructure capabilities may either entered manually in the personal computer or automatically by communicating with the light units of the home lighting infrastructure assuming the light units and the personal computer are connected via a home network, for example a LAN (Local Area Network) or WLAN (wireless LAN) or PAN (Personal Area Network). The client may also retrieve the light infrastructure capabilities which may be stored in a lighting controller of the lighting infrastructure or in each light unit. On the server, the received infrastructure capabilities may then be automatically processed, particularly by clustering several light infrastructure capabilities, creating light element templates from the clustered light infrastructure capabilities, and finally comparing the created light element templates with the light elements of the abstract description of the selected lighting atmosphere. Afterwards, the processing result may be transmitted from the server to the client. Finally, the result of the processing, i.e. whether rendering the selected lighting atmosphere from the abstract description is possible or not, may be displayed on the monitor of the personal computer of the client. Thus, a user may quickly and reliably determine whether a desired lighting atmosphere offered for buying may be rendered with her/his own home lighting infrastructure.

According to a further embodiment of the invention, the light infrastructure capabilities may be electronically received over a network connection with a lighting controller of a lighting infrastructure.

According to a further embodiment of the invention, a computer program is provided, wherein the computer program may be enabled to carry out the method according to the invention when executed by a computer.

According to an embodiment of the invention, a record carrier such as a CD-ROM, DVD, memory card, floppy disk or similar storage medium may be provided for storing a computer program according to the invention.

A further embodiment of the invention provides a computer which may be programmed to perform a method according to the invention. The computer may comprise an interface for communication with a lighting infrastructure. The communication may be for example performed over wire line or wireless communication connections between the interface and the lighting infrastructure. In case of wireless communication connections, the interface may comprise a radio frequency (RF) communication module such as a WLAN and/or Bluetooth® and/or ZigBee module which may establish a communication connection with respective counterparts of the lighting infrastructure.

According to a further embodiment of the invention, a system for automatically verifying the possibility of rendering a lighting atmosphere from an abstract description is provided, wherein the system comprises the following features:

receiving means for electronically receiving light infrastructure capabilities of a lighting infrastructure, wherein a light infrastructure capability describes light type, intensity range, light effects and location of the effects of a certain light unit of the lighting infrastructure on a target environment, processing means for automatically processing the received light infrastructure capabilities, and signaling means for signaling whether rendering the lighting atmosphere from the abstract description is possible or not.

According to an embodiment of the invention the system may comprise a lighting atmosphere design module adapted to generate the abstract description of the lighting atmosphere, and a verification module comprising the receiving, processing and signaling means.

According to an embodiment of the invention, the verification module may be implemented as a computer program executed by a computer.

According to a further embodiment of the invention, the computer may comprise a communication module comprising the receiving means.

These and other aspects of the invention will be apparent from and elucidated with reference to the embodiment(s) described hereinafter.

The invention will be described in more detail hereinafter with reference to exemplary embodiments. However, the invention is not limited to these exemplary embodiments.

FIGS. 2A to 2C show a XML file as an embodiment of an abstract atmosphere description according to the invention, wherein the file contains an abstract description of a lighting atmosphere in a shop;

Figure 6:
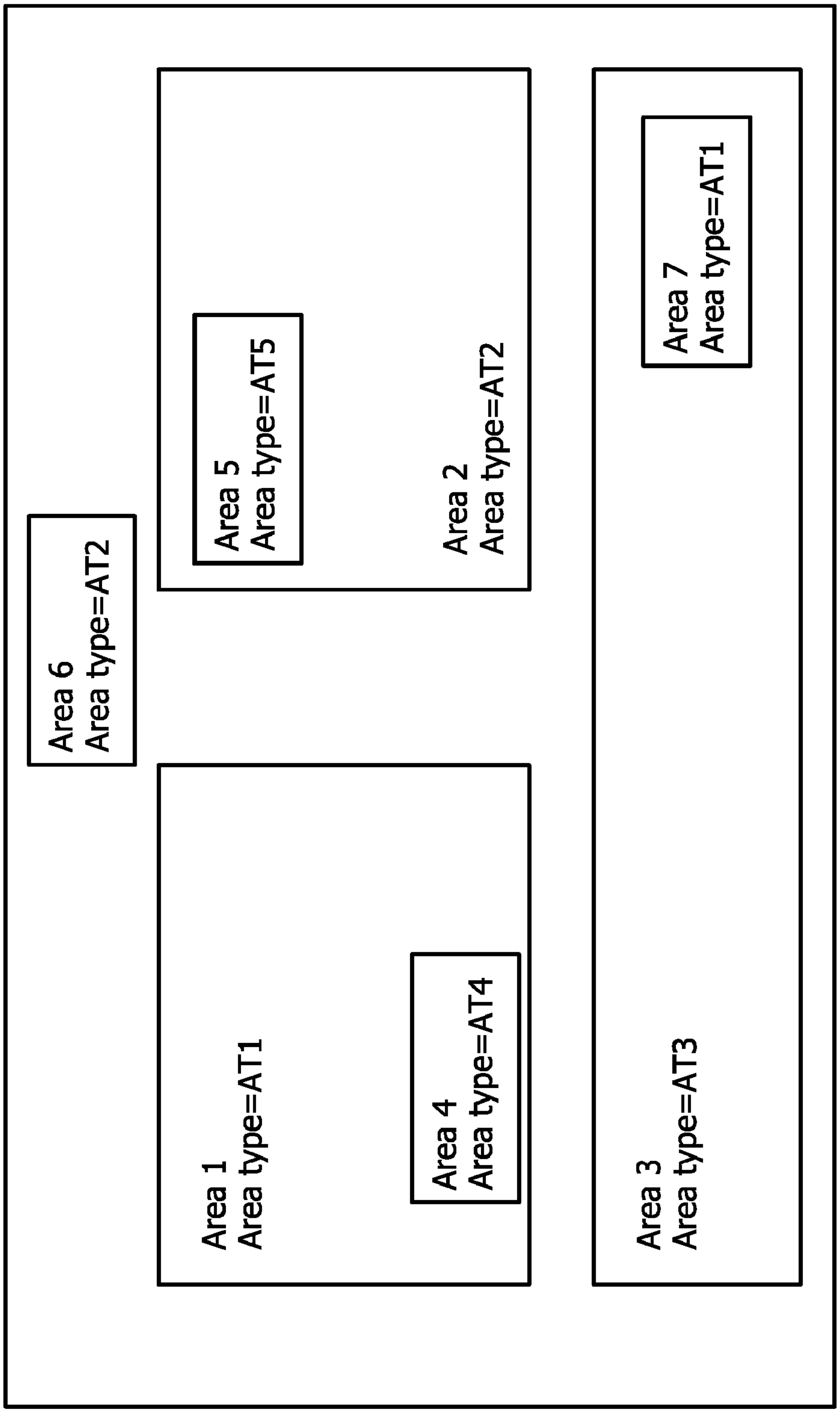
Figure 7:
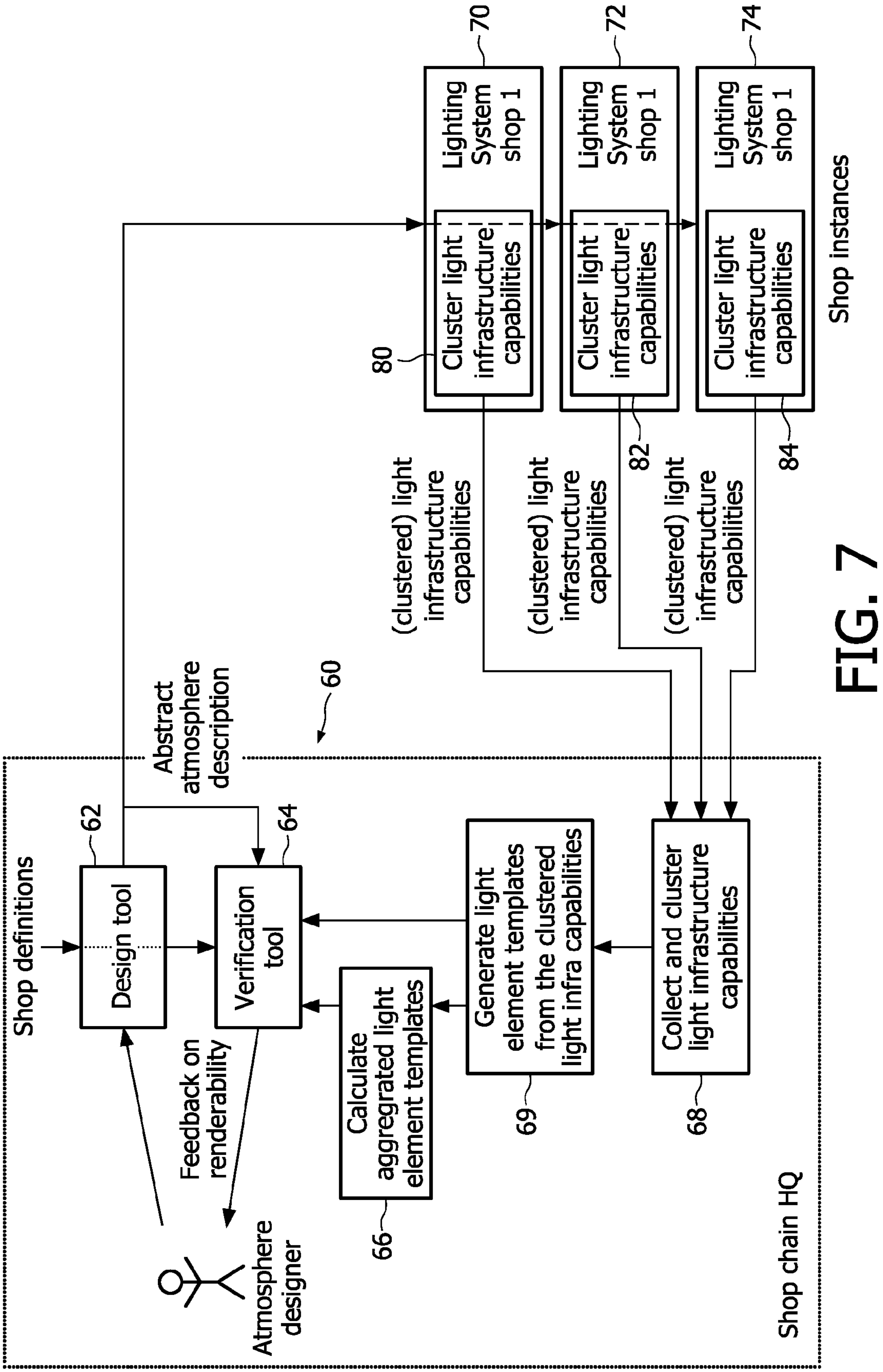
Figure 8:
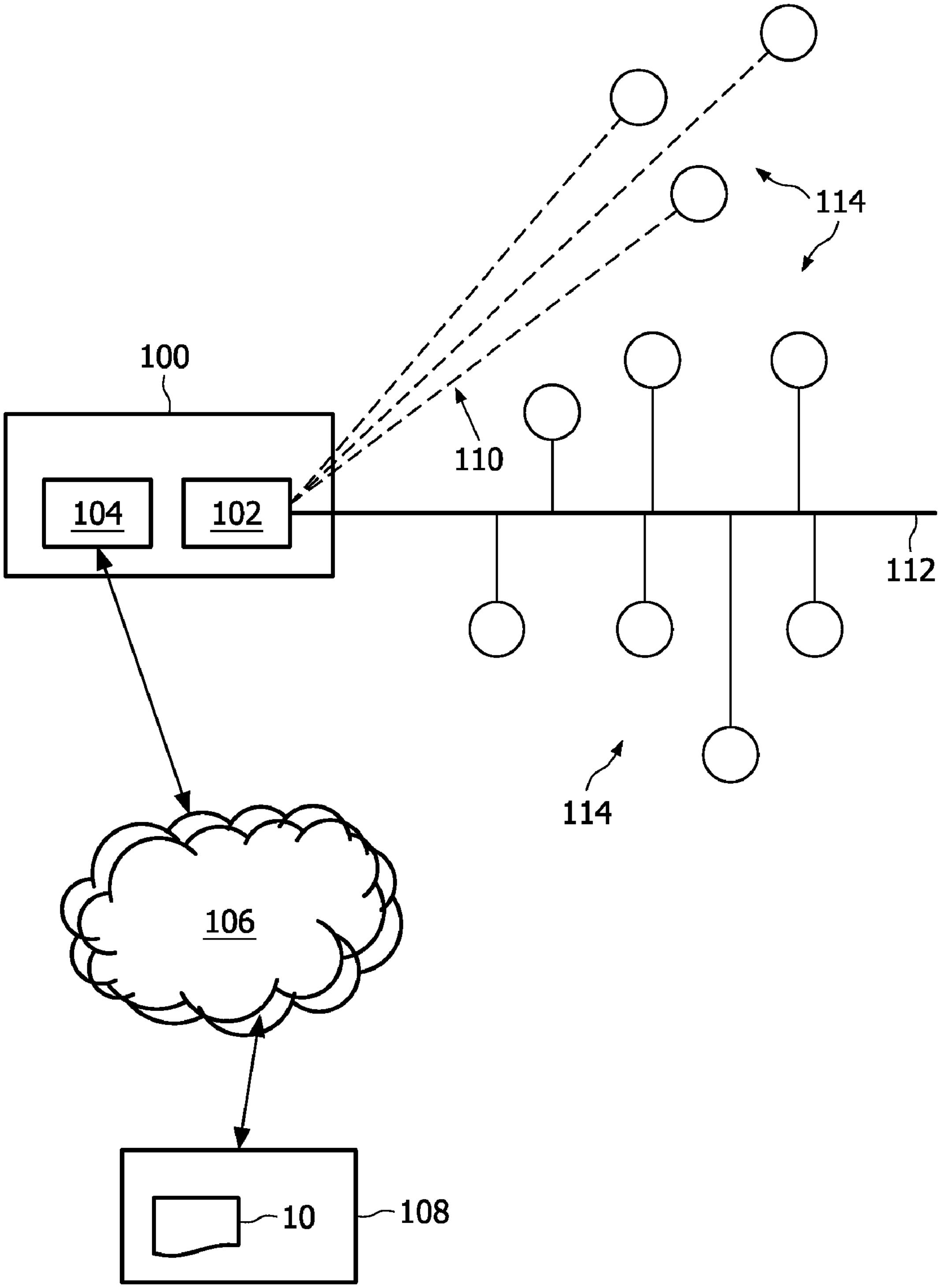

FIG. 6 shows the layout of a shop instance with different semantic areas which are classified using area types according to the invention; and FIG. 7 shows an embodiment of a system for automatically verifying the possibility of rendering a lighting atmosphere from an abstract description according to the invention; and FIG. 8 shows an embodiment of a system for creating a lighting atmosphere from an abstract atmosphere description according to the invention, wherein the abstract description is stored on a server computer in the internet for downloading.

In the following description, the terms “lighting device”, “lighting unit”, “light unit”, and “lamp” are used as synonyms. These terms mean herein any kind of electrically controllable lighting device such as a semiconductor-based illumination unit such as a LED, a halogen bulb, a fluorescent lamp, a light bulb. Furthermore, (functional) similar or identical elements in the drawings may be denoted with the same reference numerals.

Figure 1:
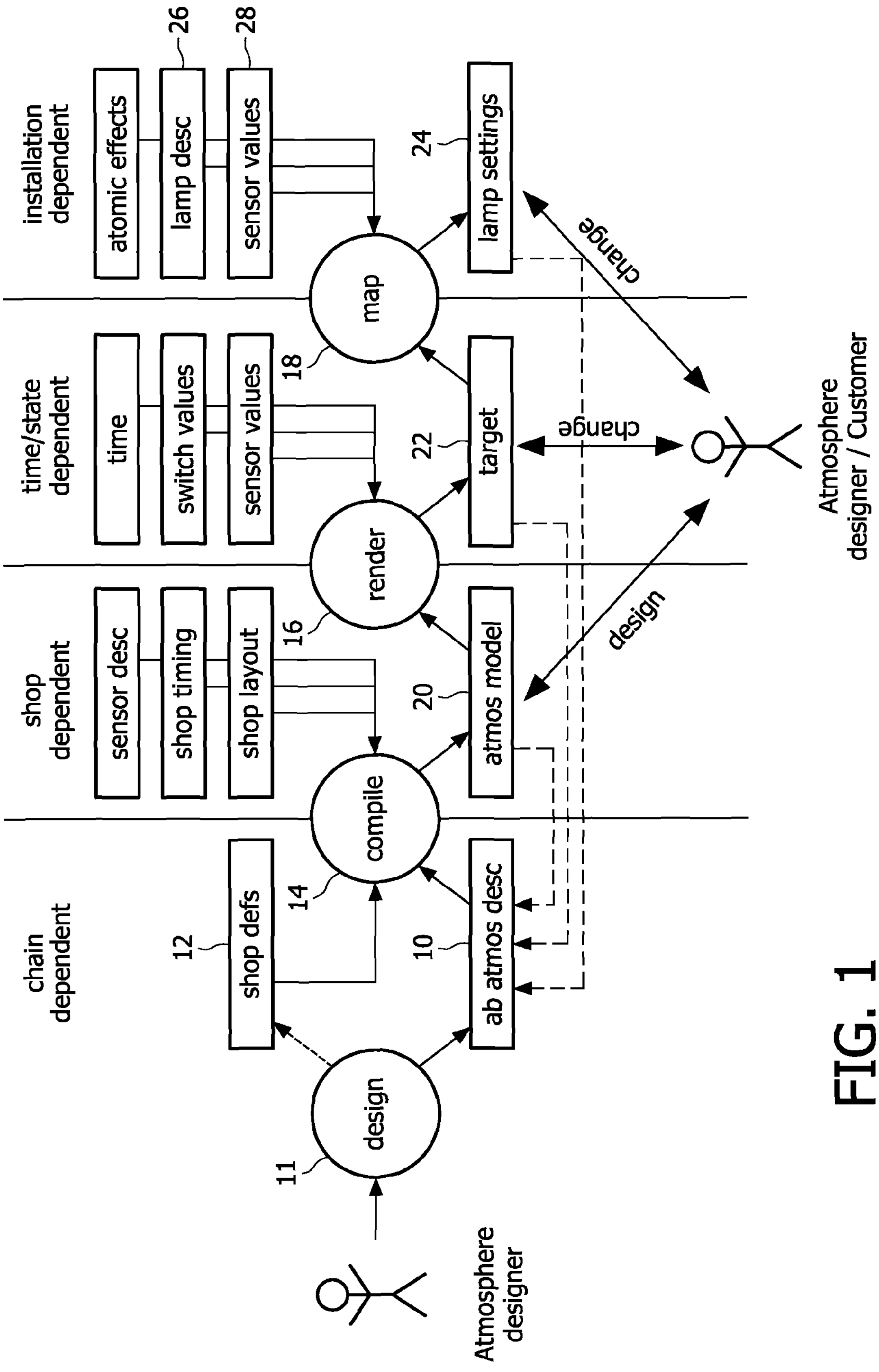
FIG. 1 shows a flow diagram of an embodiment of a method for composing a lighting atmosphere in a shop from an abstract description of the lighting atmosphere according to the invention.

An overview of a flow of a method for composing a lighting atmosphere from an abstract description for a shop is depicted in FIG. 1. Via some design process 11, for example by using a lighting atmosphere composition computer program with a graphical user interface (GUI), an abstract atmosphere description 10 is created (in FIG. 1 also denoted as ab atmos desc). The abstract atmosphere description can also be generated from one of the interaction methods depicted at the bottom of FIG. 1. The abstract description 10 merely contains descriptions of lighting effects at certain semantic locations at certain semantic times/occasions. The lighting effects are described by the type of light with certain parameters. The abstract description 10 is shop layout and lighting system independent. Thus, it may be created by a lighting designer without knowledge about a specific lighting system and lighting environment such as a room layout. The designer must know only semantic locations of the lighting environment, for example “cash register” or “shoe box 1”, “shoe box 2”, “changing cubicle”, “coat stand” in a shoe or fashion shop. When using a GUI for creating the abstract description 10, it may be for example possible to load a shop layout template containing the semantic locations. Then the designer can create the lighting effects and the atmosphere by for example drag and drop technology from a palette of available lighting devices. The output of the computer program with the GUI may be a XML file containing the abstract description 10.

An example of an XML file containing such an abstract atmosphere description is shown in FIGS. 2A to 2C. In the abstract atmosphere description, elements of the light atmosphere description are linked to semantic (functional) locations in the shop. As can be seen in FIGS. 2A to 2C, the semantic locations are introduced by the attribute “areaselector”. The lighting atmosphere at this semantic location is introduced by the tag name “lighteffecttype”. The type of light with lighting parameters is described by the tag names “ambient”, “accent”, “architectural” and “wallwash”, as picture by using the tag names “architectural” and “picturewallwash”, or as a lightdistribution. The parameters are described by the attributes “intensity”, for example of 2000 (lux/nit), and “color”, for example x=0.3, y=0.3. In case of a picture wall washing effect the shown picture is specified by the attribute “pngfile” and its intensity. In case of a light distribution, the intensity is specified, the color at the corners of the area and possibly parameters specifying the s-curve of the gradient. Furthermore, for some lights fading in and out may be specified by the attributes “fadeintime” and “fadeouttime”. Such an abstract description may be automatically translated into control values for the different lighting devices or units, i.e., lamps of a specific instance of a lighting system (in FIG. 1 denominated as lamp settings 24) in three stages:

1. Compiling 14 the abstract description 10 into an atmosphere model 20: In the compile stage 14, the abstract (shop layout and light infrastructure independent) atmosphere description 10 is translated into a shop layout dependent atmosphere description. This implies that the semantic locations 12 are replaced by real locations in the shop (physical locations). This requires at minimum some model of the shop with an indication of the physical locations and for each physical location which semantic meaning it has (e.g. one shop can have more than one cash register. These all have different names, but the same semantics). This information is available in the shop layout. Beside the semantic locations, also semantic notions of time (e.g. opening hours) are replaced by the actual values (e.g. 9:00-18:00). This information is available in the shop timing. Furthermore, for light effects that depend on sensor readings, an abstract sensor is replaced by the (identifier of the) real sensor in the shop. These shop dependent values are contained in a shop definitions file 12 containing specific parameters of the shop and the applied lighting system. The shop definitions contain the vocabulary that can be used in the abstract atmosphere, shop layout and shop timing. The output of the compiler stage is the so called atmosphere model 20 (atmos model), which still contains dynamics, time dependencies and sensor dependencies.

2. Rendering 16 the atmosphere model 20 to a target 22: In the rendering stage, all dynamics, time dependencies and sensor dependencies are removed from the atmosphere model 20. As such, the render stage creates a snapshot of the light atmosphere at a certain point in time and given sensor readings at that point in time. The output of the render stage is called the target 22. The target 22 can consist of one or more view points and per view point a color distribution, an intensity distribution, a CRI (Color Rendering Index) distribution, . . . .
3. Mapping 18 the target 22 into actual control values 24 for lighting devices, i.e. the lamp: The mapping stage converts the target 22 into actual lamp control values 24 (lamp settings). In order to calculate these control values 24, the mapping loop requires:
   a. Descriptions of the lamps 26 available in the lighting system, like the type of lamp, color space, . . .
   b. The so-called atomic effects 26 which describe which lamp contributes in what way to the lighting of a certain physical location. How these atomic effects are generated is described below.
   c. In case of controlling the lights with a closed feedback loop, the sensor values 28 to measure the generated light.

Based on these inputs 26 and 28 and the target 22, the mapping loop 18 uses an algorithm to control the light units or lamps, respectively, in such a way that the generated light differs as little as possible from the target 22. Various control algorithms can be used, like classical optimization, neural networks, genetic algorithms etc.

As already indicated, the mapping process 18 receives a target light “scene” from the rendering process 16. In order to calculate the lamp settings 24 required to generate light that approximates the target 22 as close as possible, the mapping process 18 needs to know which lamps contribute in what way to the lighting of a certain physical location. This is done by introducing sensors, which can measure the effects of a lighting device or lamp, respectively, in the environment. Typical sensors are photodiodes adapted for measuring the lighting intensity, but also cameras (still picture, video) may be considered as specific examples of such sensors.

As indicated above, abstract descriptions of lighting atmospheres will become possible in the future, both in professional (e.g. shop) as well as in the consumer domain. In both domains, it would be desirable to know beforehand how well such an abstract description of a light atmosphere can be rendered in a specific shop or home lighting infrastructure.

For instance, if a light designer at the head quarters of a shop chain wants to make a new light atmosphere for the shop chain, it is important that this light designer gets feedback on how well the atmosphere can be rendered in the shops of the shop chain.

This can be done by communicating the information of the lighting infrastructure (available light units, their characteristics and location) for all shops in the chain to the light designer. However, this method has large disadvantages. The amount of light sources can be very large, up to thousands of light sources per shop. This implies that simply communicating what kind of light units are available does not scale and will ‘overwhelm’ the light designer. Furthermore, the location of light units in the shop is not relevant to the light designer, but merely what the semantic location (e.g. entrance) of the light effect is. This requires transferring a detailed shop layout of every shop in the chain towards the light designer at the shop’s head quarter (HQ), which again does not scale.

In the consumer domain, end-users that purchase an abstract light atmosphere of course want to be sure that such a light atmosphere can be rendered in their home, with its specific layout and lighting infrastructure. However, such an end-user is usually not an expert in lighting design and lighting systems. Consequently, it needs to be possible to verify in advance whether such a light atmosphere can be rendered. Impossibilities and limitations in the rendering need to be communicated to the consumer in an understandable way.

According to the present invention, a mechanism that enables verification of how well a light atmosphere can be rendered in a specific shop chain or home in a scalable and meaningful way is proposed as will be explained in the following in detail.

Figure 3:
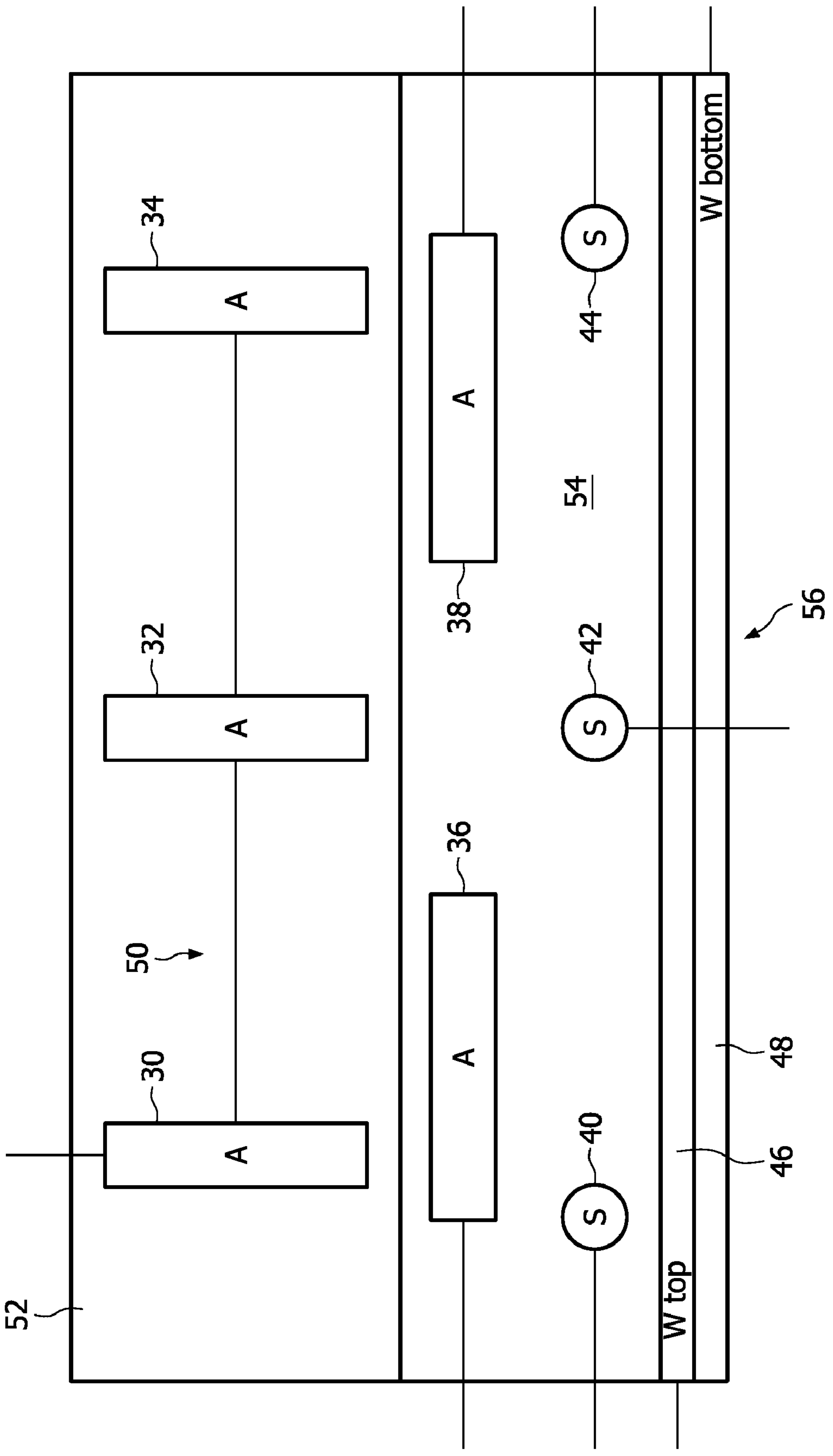
FIG. 3 shows an example of a floor plan with light units and semantic areas.

In FIG. 3, an example of a floor plan with light units of a certain lighting system is given. Five TL’s 30, 32, 34, 36, 38 (A), three spotlights 40, 42, 44 (S) and two wall washers 46, 48 (W) are present. The RGB-wall washers 46 and 48 are individually addressable, and color the upper and lower part of a wall. The three spotlights 40, 42 and 44 are individually addressable. Three TL’s 30, 32 and 34 are grouped as one light unit 50, the other two 36 and 38 are individually addressable. Three different semantic areas are indicated by reference numerals 52, 54 and 56.

In order to give an early feedback of whether a certain lighting atmosphere may be rendered in this lighting system, a light management system has to find or create knowledge on the lighting infrastructure. In order to make an early feedback possible, light infrastructure capabilities are created for every individually addressable light unit.

A light infrastructure capability is created for each individually addressable light unit of the lighting system and describes the light type, intensity range, light effects and location of the effects on the environment. This can be done in (a combination of) several ways:

Announcement of individual light units, light unit controllers that provide a description of their control interfaces.

(Dark Room) Calibration where the effect of specific control sets is executed on light units, and the effect of them is measured by cameras and sensors.

Configuration by a lighting system installer.

Figure 4:
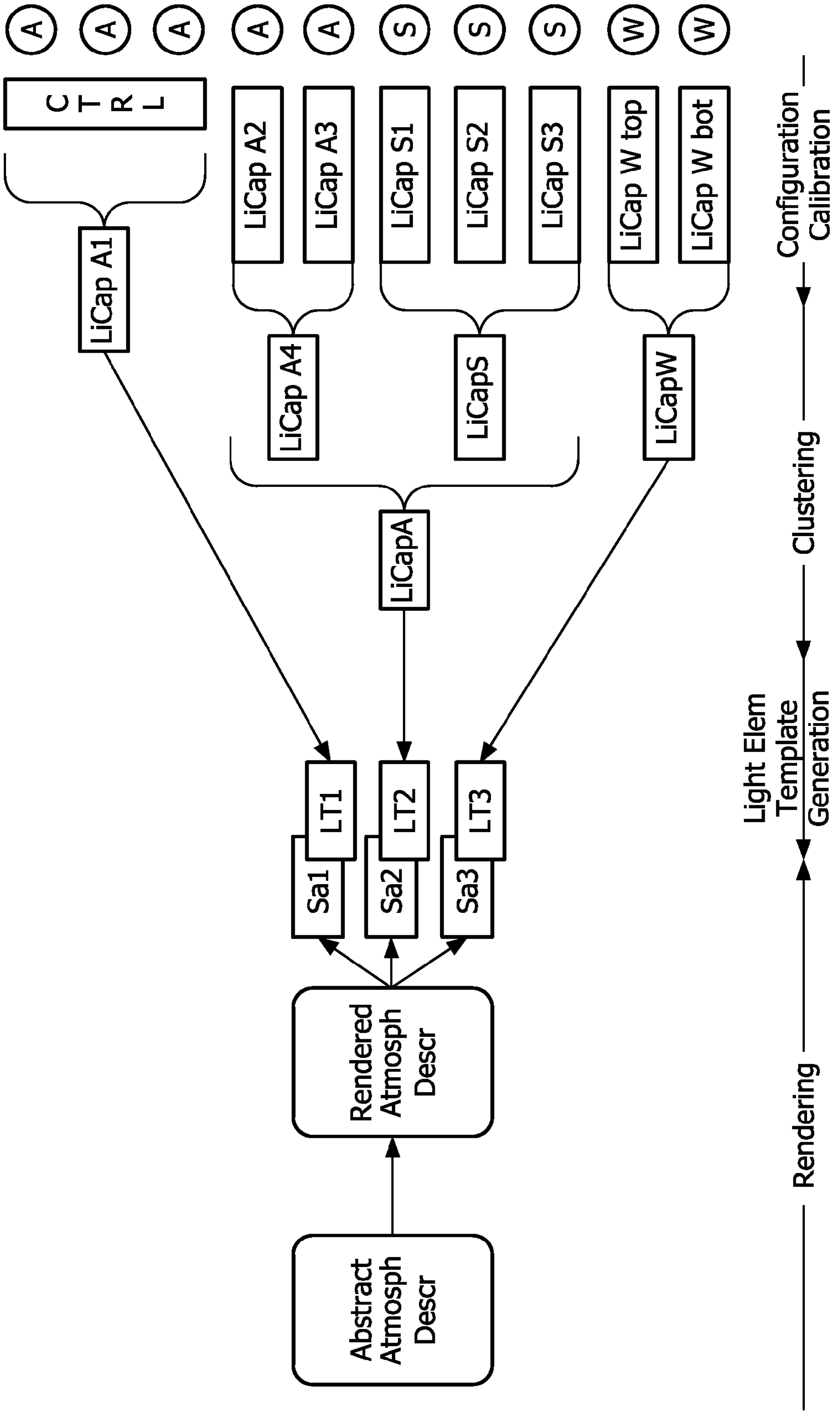
FIG. 4 shows the application of lighting infrastructure capabilities and their clustering for a light element template generation in a process of automatically rendering a certain lighting atmosphere from an abstract description.

FIG. 4 shows how light infrastructure capabilities of the single light units 30, 32, 34, 36, 38, 40, 42, 44, 46, and 48 may be clustered for the process of automatically rendering a lighting atmosphere with a certain lighting system from an abstract description. The light infrastructure capabilities LiCap A1-A3 for the light units 30, 32, 34, 36, 38, S1-S3 for the light units 40, 42, 44, and “W top” and “W bot” for the light units 46 and 48, respectively, are clustered into larger groups of light infrastructure capabilities, and several criteria are used for this clustering:

Light units of the same type.

Light units that create similar effects in adjacent locations.

Light units that have an effect in one semantic area

For the semantic area 52, the three TL’s 30, 32, and 34 form a single light unit 50 with a single light infrastructure capability LiCap A1. For the semantic area 54, the spot lights 40, 42, and 44 and TL’s 36 and 38 are clustered first to light infrastructure capabilities LiCap S and LiCap A4, respectively. Then the light infrastructure capabilities of these light units 36, 38, 40, 42, 44 are clustered to one light infrastructure capability LiCap A for the semantic area 54. This light infrastructure capability results in a lighting possibility for the area 54. The wall washers 46 and 48 are individually addressable. They are of the same type and have an effect in adjacent locations of an area 56. They are clustered into another light infrastructure capability LiCap W which describes an RGB Wallwash effect with top-bottom gradient possibilities.

From these lighting infrastructure capabilities or possibilities LiCap A1, LiCap A and LiCap W, light element templates LT1, LT2, and LT3, respectively, may be created as described in the European patent application no. 06127084.9 of the applicant. These light element templates may then be further processed by a light management system which renders the lighting atmosphere from the abstract description. A light element template is an indication of the possibilities of the lighting infrastructure at a certain (semantic) location in the shop or home. For every type of light effect, a different light element template will be created. In the following, the light element templates and their function is explained in detail.

FIG. 6 depicts the layout of a shop instance with several lighting areas 1 to 7. The different areas area 1 to area 7 are classified using area types AT1 to AT5. Examples of area types are "entrance", "discount", "groceries" etc.

The lighting possibilities for the different areas 1 to 7 in e.g. a shop can be 'summarized' according to the type of light that the light units can generate. This is performed by processing the light infrastructure capabilities of the light units as described above with regard to FIGS. 3 and 4, and will be described below with regard to FIG. 5. The result of the processing of the light infrastructure capabilities may be the lighting possibilities of the different areas of the shop layout depicted in FIG. 6. An example of a processing result is listed in the following:

| |
|---|
| Area1 |
| Area type = AT1<br>Area selector = AT1<br>LightType = Ambient<br>MaxIntensity = 1500 Lux<br>Color = White |
| Area2 |
| Area type = AT2<br>Area selector = AT2<br>LightType = Ambient<br>MaxIntensity = 2000 Lux<br>Color = White<br>LightType = Task<br>MaxIntensity = 6000 Lux<br>Color = RGB |
| Area3 |
| Area type = AT3<br>Area selector = AT3<br>LightType = Ambient<br>MaxIntensity = 2000 Lux<br>Color = White |
| Area4 |
| Area type = AT4<br>Area selector = AT4 \|\| AT1/AT4<br>LightType = Accent<br>MaxIntensity = 6000 Lux<br>Color = White |

-continued

| |
|---|
| Area5 |
| Area type = AT5<br>Area selector = AT5 \|\| AT2/AT5<br>LightType = Accent<br>MaxIntensity = 4000 Lux<br>Color = White |
| Area6 |
| Area type = AT2<br>Area selector = AT2<br>LightType = Ambient<br>MaxIntensity = 1000 Lux<br>Color = White<br>LightType = Architectural/wallwash<br>MaxIntensity = 500 nit<br>Color = RGB |
| Area7 |
| Area type = AT1<br>Area selector = AT1 \|\| AT3/AT1<br>LightType = Ambient<br>MaxIntensity = 1500 Lux<br>Color = White<br>LightType = Architectural/wallwash<br>MaxIntensity = 1000 nit<br>Color = RGB |

In the above listed data for the different areas in the shop instance, the area selector is an indication of the semantic area in the shop or home. It may consist of one or more area types. For example, the area selector AT2/AT5 refers to all areas with type AT 5, which are a subarea of the areas with type AT2

By organizing and grouping this summarized lighting infrastructure information by the area selector, light element templates may be generated. All light element templates for the shop instance of FIG. 6 are as follows:

LightElementTemplate1
Area selector=AT1
LightType=Ambient
Highest MaxIntensity=1500 Lux
Lowest MaxIntensity=1500 Lux
Color=White
LightType=Architectural/wallwash
Highest MaxIntensity=1000 nit
Lowest Max Intensity=0 nit
Color=RGB
LightElementTemplate2
Area selector=AT2
LightType=Ambient
Highest MaxIntensity=2000 Lux
Lowest MaxIntensity=1000 Lux
Color=White
LightType=Task
Highest MaxIntensity=6000 Lux
Lowest MaxIntensity=0 Lux
Color=RGB
LightType=Architectural/wallwash
Highest MaxIntensity=500 nit
Lowest MaxIntensity=0 nit
Color=RGB
LightElementTemplate3
Area selector=AT3
LightType=Ambient
Highest MaxIntensity=2000 Lux
Lowest MaxIntensity=2000 Lux
Color=White
LightElementTemplate4
Area selector=AT1/AT4
LightType=Accent
Highest MaxIntensity=6000 Lux
Lowest MaxIntensity=6000 Lux Color=White
LightElementTemplate5
Area selector=AT2/AT5
LightType=Accent
Highest MaxIntensity=4000 Lux
Lowest MaxIntensity=4000 Lux
Color=White
LightElementTemplate6
Area selector=AT3/AT1
LightType=Ambient
Highest MaxIntensity=1500 Lux
Lowest MaxIntensity=1500 Lux
Color=White
LightType=Architectural/wallwash
Highest MaxIntensity=1000 nit
Lowest MaxIntensity=1000 nit
Color=RGB The light element templates for the area selectors AT4 and AT5 are removed, as these do not occur 'individually' in the shop, but only in the combination AT1/AT4 and AT2/AT5.

As explained with reference to FIGS. 2A to 2C, the abstract light atmosphere, made by a light designer, is specified in abstract light elements. For example:

LightElement1
Areaselector=AT1
LightType=Ambient
Intensity=1200 Lux
Color=white.
LightElement2
AreaSelector=AT5
LightType=Architectural/wallwash
Intensity=1000 nit
Color=yellow
LightType=accent
Intensity=3000 Lux
Color=white By comparing the light elements of the atmosphere description with the light element templates created from the light infrastructure capabilities as described above, it can be verified quickly and automatically whether it is possible to render the light elements in the specific shop or home. In the example, it is immediately clear that wall washing in areas with an area selector that ends with AT5 is not possible. If rendering is not possible, feedback can be provided for example at a semantic level, like displaying a message like "it is not possible to create a wall wash effect in the area with area type 5" in the light designer's computer monitor.

Figure 5:
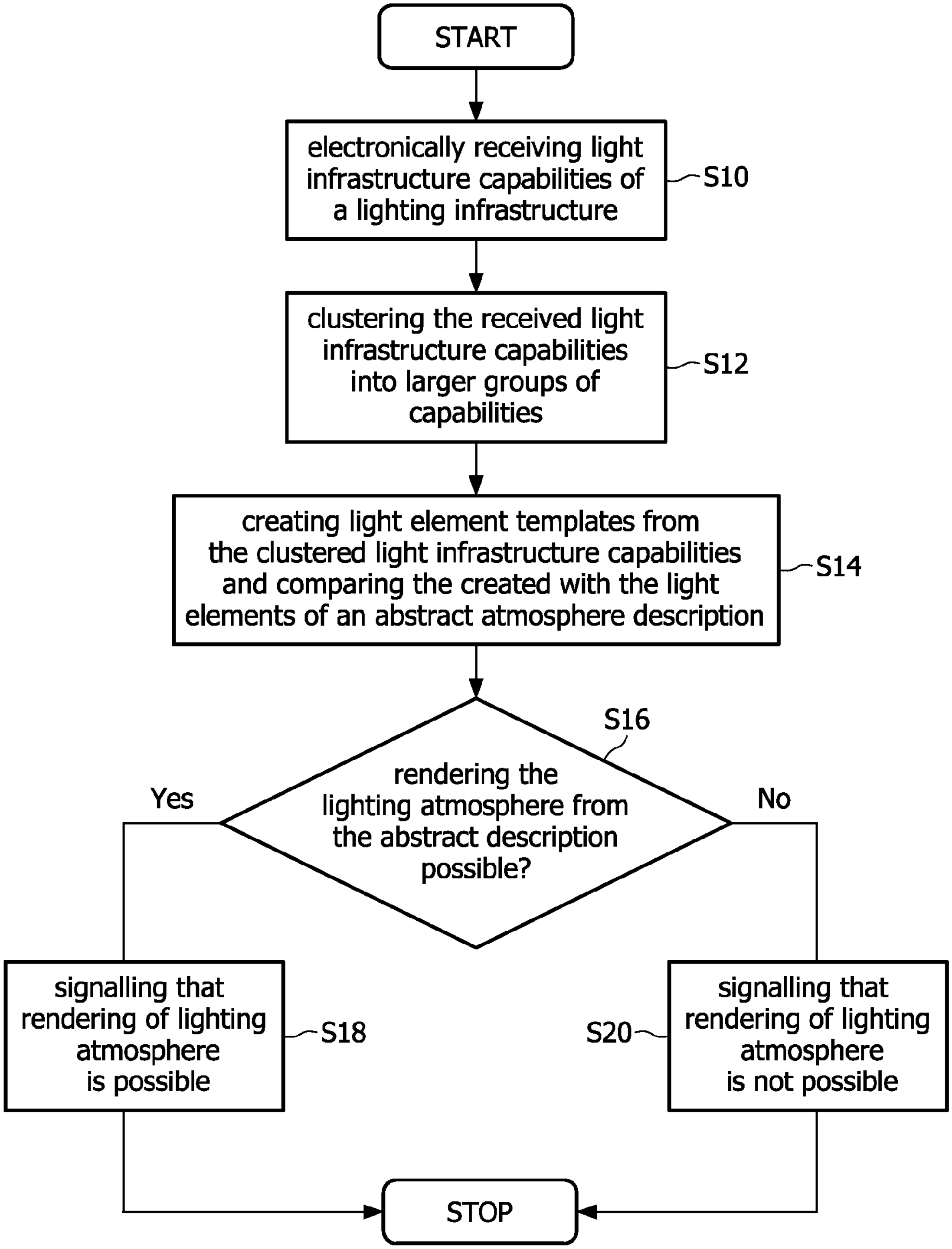
FIG. 5 shows a flowchart of an embodiment of the method for automatically verifying the possibility of rendering a lighting atmosphere from an abstract description according to the invention.

Finally, FIG. 5 outlines in a flowchart essential steps of the verification process. First, in a step S10, light infrastructure capabilities are electronically received, for example from a light system controller via a computer network such as the internet, by a computer system configured to perform the verification process. Then, in step S12, the received light infrastructure capabilities are clustered into larger groups of light infrastructure capabilities according to their effects in different semantic areas. In the following step S14, light element templates are created from the clustered light infrastructure capabilities, particularly as described above, and compared with the light elements of an abstract description of a lighting atmosphere. In a next step S16, it is checked whether rendering the lighting atmosphere in the lighting infrastructure of the shop instance and as represented by the received light element templates is possible or not. If the rendering is possible, this is signaled for example to a user or to a system for automatically configuring the lighting infrastructure in order to create the desired lighting atmosphere in a step S18. Otherwise, it is signaled that the rendering is not possible in a step S20.

FIG. 7 depicts a system 60 for automatically verifying the possibility of rendering a lighting atmosphere from an abstract description, which offers two possibilities to verify the light atmosphere on how well it can be rendered:

- Against aggregated light element templates, derived from the light infrastructure capabilities, for all shops, which gives an indication of how well the atmosphere can be rendered in all shops of the chain
- Against light element templates, derived from the light infrastructure capabilities of the individual shops, providing feedback on shop instance level.

The light infrastructure capabilities of the light infrastructure of the individual shops 70, 72 and 74 are collected and can be clustered to light infrastructure capabilities of groups of lamps by the local clustering modules 80, 82 and 84.

At the shop chain HQ, an atmosphere designer creates lighting atmospheres for the shops of the chain using a design tool 62. The design tool 62 receives the shop definitions as additional input to the designer's inputs for designing the lighting atmosphere. The verification system 60 comprises a collection and clustering module 68 for collecting the (clustered) light infrastructure capabilities from the lighting systems 70, 72 and 74 of the different shops of the chain, a light element template generator 69 for creating the light element templates for the lighting systems 70, 72 and 74 from their (clustered) light infrastructure capabilities, a calculation module 66 for calculating the aggregated light element templates for the chain of shops with lighting systems 70, 72 and 74 and a verification tool 64

The collection and clustering module 68 receives the light infrastructure capabilities of the different lighting systems 70, 72 and 74. For every lighting system, it clusters them further into light infrastructure capabilities of groups of lights, according to one or more of the earlier mentioned criteria. The light element template generator 69 uses the light infrastructure capabilities of the individual lighting systems to derive light element templates of the lighting systems 70, 72 and 74

When the designer has finished designing a certain lighting atmosphere and created the abstract description of the lighting atmosphere which may be automatically created by the design tool 62, she/he may initiate the verification process according to the invention by clicking for example on a verification button of the design tool 62. The design tool 62 then triggers the verification tool 64 which receives the abstract description from the design tool 62 and either

- receives the aggregated light element templates from the calculation module 66 and compares them with the abstract description for performing a verification for all shops.
- or it receives the generated light templates of the individual shops from the light element template generator 69 and compares them with the abstract description for performing a verification on the shop instance level The verification tool 64 then indicates how well the atmosphere may be rendered in all shops or in the shops individually. The result of the verification is displayed on a monitor of the designer's computer so that the designer may next decide whether the abstract atmosphere description is transmitted to the lighting systems 70, 72 and 74 of the different shops of the chain.

As already indicated, this invention can also be used by consumers that intend to buy light atmospheres for e.g. their home. In that case, the light atmosphere is verified against the light element templates created from the light infrastructure capabilities of the home in question. If the light atmosphere is not realizable for certain area selectors, feedback to the user should be provided in a clear and concrete way. This implies that for rendering issues, the most specific area selector where the rendering issue occurs should be provided to the user. In the earlier example, where the light element for AT5 was conflicting with the light element templates of area selectors AT5 and AT2/AT5, the indication to the user should be that wall washing is not possible in area AT2/AT5. Actually, for lighting designers, the problem is indicated in the light design, for example by the verification module 64 executed by the light designer's computer as shown in FIG. 7, while for end-consumers potential issues are indicated in terms of light element templates, being a representation of the lighting infrastructure in the home.

FIG. 8 shows a system for creating a lighting atmosphere from an abstract atmosphere description in a user's home lighting infrastructure. The system comprises a user's PC 100. The PC 100 comprises an interface 102 for communication with a lighting system containing several lighting units 114. The interface 102 is adapted to communicate with the lighting units 114 via a communication bus 112 and RF communication connections 110. The PC 100 transmits control values or settings over the communication connections 110 and 112 to the lighting units 114 in order to adjust them, particularly their lighting intensities and colors. Finally the PC 100 contains receiving means 104 such as a network adapter for receiving an abstract atmosphere description 10 from a server computer 108 over the internet 106. The server computer 108 also hosts a website for abstract lighting atmospheres. Thus, a user can access this website through her/his PC 100 and select a desired abstract lighting atmosphere. By clicking on a certain button on the website, the PC 100 may upload light infrastructure capabilities of the lighting units 114 of the user's home lighting system which are stored on the user's PC 100. The server computer 108 then verifies whether rendering the desired lighting atmosphere in the user's lighting system is possible or not, for example as shown in FIG. 5. When the verification process is finished, the result may be displayed by the website so that the user sees whether the desired lighting atmosphere may be rendered in her/his lighting system. Thereafter, the user may download the desired abstract description of the desired lighting atmosphere from the server computer 108 onto her/his PC 100, for example after paying the supplier of the abstract lighting atmospheres. The PC 100 may start to process the downloaded abstract atmosphere description 10. The downloaded abstract atmosphere description 10 is processed in the PC 100 in order to obtain a set of control values that may be communicated to the lighting units 114 over the connections 110 and 112 in order to implement the lighting atmosphere in the user's home lighting system.

The invention can be applied to all situations where abstract light atmospheres are being made for a multitude of lighting infrastructures and/or room layouts. Target environments may be for example commercial environments (shops, hotels), home environments, outdoors lighting, and further complex lighting infrastructures.

In the situation that a light atmosphere cannot be realized by a certain lighting infrastructure, advice can also be given on what type of light units to add in which semantic area(s) in the shop/home, for example by displaying a respective user's help on a computer monitor.

At least some of the functionality of the invention such as the process of verification may be performed by hard- or software. In case of an implementation in software, a single or multiple standard microprocessors or microcontrollers configuration may be used. The invention might be implemented by single or multiple algorithms.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A computer-implemented method for automatically verifying the possibility of rendering a lighting atmosphere from an abstract description comprising:

electronically receiving light infrastructure capabilities of a lighting infrastructure (S10), wherein a light infrastructure capability describes at least one light type, intensity range, light effects and location of the effects of a certain light unit of the lighting infrastructure on a target environment, automatically processing by a computer server the received light infrastructure capabilities, and signaling by said computer server whether rendering the lighting atmosphere from the abstract description is possible or not (S14, S16, S18, S20).

2. The method of claim 1, further comprising the step of automatically creating a light infrastructure capability for every individually addressable light unit of the lighting infrastructure.

3. The method of claim 2, wherein a light infrastructure capability for an individually addressable light unit (A, S, W) is created by a light unit controller of the light infrastructure which provides a description of its control interface and announces the controlled light units.

4. The method of claim 2, wherein a light infrastructure capability for an individually addressable light unit is created by means of a dark room calibration, where the effect of specific control sets is executed on the light unit and the effect of the controlled light unit is measured by cameras and/or sensors.

5. The method of claim 1, wherein the step of automatically processing the received light infrastructure capabilities comprises clustering several light infrastructure capabilities into larger groups of light infrastructure capabilities.

6. The method of claim 5, wherein one or more of the following criteria are used for the clustering:

light units of the same type, light units that create similar effects in adjacent locations in the lighting infrastructure, and light units that have an effect in one semantic area.

7. The method of claim 1, wherein the step of automatically processing the received light infrastructure capabilities comprises:

creating light element templates from the received light infrastructure capabilities of the lighting infrastructure, wherein a light element template contains an indication of the possibilities of the lighting infrastructure at a certain semantic location of a lighting infrastructure, and comparing the created light element templates with the light elements of the abstract description.

8. The method of claim 1, further comprising:

the step of automatically making information on available light units of the lighting infrastructure and their capabilities available in a network environment by means of a service and device discovery mechanism.

9. The method of claim 1, further comprising the steps of selecting a lighting atmosphere by a client communicating with said server, transmitting light infrastructure capabilities of a lighting infrastructure from the client to said server, automatically processing the received light infrastructure capabilities, transmitting the processing result from said server to the client, and signaling whether rendering the lighting atmosphere from the selected abstract description is possible or not depending on the received processing result on the client.

10. The method of claim 1, wherein the light infrastructure capabilities are electronically received over a network connection with a lighting controller of a lighting infrastructure.

11. System for automatically verifying the possibility of rendering a lighting atmosphere from an abstract description comprising:

a lighting system server for electronically receiving light infrastructure capabilities of a lighting infrastructure, wherein a light infrastructure capability describes at least one of a light type, intensity range, light effects and location of the effects of a certain light unit of the lighting infrastructure on a target environment, said server including processing means for automatically processing the received light infrastructure capabilities, and signaling means for signaling whether rendering the lighting atmosphere from the abstract description is possible or not.

12. The system of claim 11, comprising:

a lighting atmosphere design module adapted to generate the abstract description of the lighting atmosphere, and a verification module comprising the receiving, processing and signaling means.

13. A computer implemented method for automatically verifying the rendering of a lighting atmosphere from an abstract description, comprising:

electronically receiving within a lighting system server a plurality of light infrastructure capabilities for each of a plurality of lighting units of a lighting infrastructure;

wherein said light infrastructure capability includes at least one light type, intensity range, light effects and location of the effects of a certain light unit of the lighting infrastructure on a target environment;

automatically processing within said lighting system server the received light infrastructure capabilities;

clustering a plurality of light infrastructure capabilities into larger groups of light infrastructure capabilities according to predetermined criteria;

creating at least one light element template from said received light infrastructure capabilities of said lighting infrastructure;

wherein said at least one light element template includes an indication of the possibilities of the lighting infrastructure at a certain semantic locations of said lighting infrastructure;

comparing said at least one light element template with said abstract description;

identifying by said server whether rendering said lighting atmosphere derived from said abstract description can be implemented on said lighting infrastructure.

* * * * *